United States Patent [19]

Langer, Jr.

[11] 4,383,938

[45] May 17, 1983

[54] CATALYST SYSTEM FOR OLEFINIC POLYMERIZATION

[75] Inventor: Arthur W. Langer, Jr., Watchung, N.J.

[73] Assignee: Exxon Research and Engineering Co., Florham Park, N.J.

[21] Appl. No.: 254,646

[22] Filed: Apr. 16, 1981

Related U.S. Application Data

[63] Continuation of Ser. No. 172,769, Jul. 21, 1980, abandoned, which is a continuation of Ser. No. 790,832, Apr. 25, 1977, abandoned, which is a continuation-in-part of Ser. No. 767,748, Feb. 11, 1977, abandoned.

[51] Int. Cl.³ .................. C08F 4/64; C08F 10/06
[52] U.S. Cl. .................. 252/429 B; 252/429 C; 526/125; 526/142; 526/151
[58] Field of Search .................. 252/429 C, 429 B

[56] References Cited

U.S. PATENT DOCUMENTS

| | | | |
|---|---|---|---|
| 3,118,865 | 1/1964 | Bruce et al. | 526/151 |
| 3,238,146 | 3/1966 | Hewett et al. | 526/151 |
| 3,846,387 | 11/1974 | Su | 526/151 |
| 3,880,817 | 4/1975 | van den Berg et al. | 526/151 |
| 4,120,820 | 10/1978 | Birkelbach | 526/151 |

FOREIGN PATENT DOCUMENTS

| | | |
|---|---|---|
| 2517567 | 10/1975 | Fed. Rep. of Germany . |
| 1235062 | 6/1971 | United Kingdom . |
| 1251177 | 10/1971 | United Kingdom . |
| 1286867 | 8/1972 | United Kingdom . |
| 1292853 | 10/1972 | United Kingdom . |
| 1436426 | 5/1976 | United Kingdom . |

*Primary Examiner*—Edward J. Smith
*Attorney, Agent, or Firm*—Richard E. Nanfeldt

[57] ABSTRACT

A new improved catalyst system for alpha-olefin type polymerizations includes a metal di- or tri-halide compound of Al, Ga, or In and a diorganomagnesium compound in combination with a Group IVB-VIII transition metal compound. The improved catalyst system provides increased polymerization activity and polymers having a high degree of isotactic stereoregularity.

1 Claim, No Drawings

CATALYST SYSTEM FOR OLEFINIC POLYMERIZATION

This is a continuation of application Ser. No. 172,769, filed 7/21/80 which is a continuation of 790,832, filed 4/25/77; which is a continuation in part of 767,748, filed 2/11/77, all said applications now abandoned.

FIELD OF THE INVENTION

A new improved catalyst system for alpha-olefin type polymerizations includes a Group IVB-VIII transition metal compound in combination with a metal di- or tri-halide compound selected from the group consisting of R"$WX_2$, or R"WXY, and a diorganomagnesium compound (R R'Mg), wherein W is selected from the group consisting of Al, Ga and In; R and R' which can be the same or different are selected from the group consisting of $C_1$ to $C_{20}$ alkyl, branched alkyl, cycloalkyl, naphthenic, aryl, aralkyl, alkenyl and allyl groups; R" is selected from the group consisting of $C_1$ to $C_{20}$ alkyl, branched alkyl, cycloalkyl, naphthenic and aryl or aralkyl, X is selected from the group consisting of chloride and bromide, and Y is selected from the group consisting of chloride, bromide and a monovalent anion which cannot initiate polymerization of olefinic monomers.

The improved catalyst system provides increased polymerization activity and polymers having a high degree of isotactic stereoregularity.

BACKGROUND OF THE INVENTION

There is extensive art on the polymerization of ethylene and higher alpha-olefins, including dienes, using Ziegler type catalysts containing either alkyl metals or alkyl metals in which an alkyl group has been replaced by X, OR, SR, $NR_2$, etc., in combination with a transition metal compound of Groups IVB-VIII, where X=halide, and R=$C_1$ to $C_{20}$ hydrocarbyl substituent.

For the commercial stereospecific polymerization of propylene and higher alpha olefins, only a few alkyl metal compounds have been found effective in combination with titanium or vanadium chlorides. Commercially, only $R_2AlCl$ or $R_3Al$ are used together with a crystalline form of $TiCl_3$ or $TiCl_3.nAlCl_3$. Mixtures of $R_3Al$ and $R_2AlCl$ and $RAlCl_2$ are made in situ and have been disclosed as catalyst components frequently in the art. However, $RAlCl_2$ is known to be a catalyst poison (A. Caunt, J. Polymer Sci. C4, 49 (1963).) R is preferably ethyl (Et) or isobutyl; n=0.01 to 0.75.

This inventor's U.S. Pat. No. 3,418,304 discloses a complex of alkyl metal compounds such as $Et_2AlNEt_2$ and Lewis acid salts such as $AlCl_3$ and $MgCl_2$, e.g. $Et_2AlNEt_2.AlCl_3$ as co-catalysts to entirely replace conventional aluminum alkyls, but such complexes are entirely different from the concept of utilizing diorganomagnesium compounds in combination with a Group III metal halide as catalyst supplements for Ziegler systems employing Ti metal transition halide.

U.S. Pat. No. 3,638,897 teaches a catalyst system for the polymerization of alpha-olefins which includes a titanium compound, an alkyl aluminum halide compound, and a metal halide; however, this patent fails to recognize the use of a diorganomagnesium compound as an integral part of the catalyst system. Other references are U.S. Defensive Publication No 08874; German Pat. No. 2,620,886; Netherland Pat. Nos. 7,203,108; 7,110,405 and 7,114,905; Belgium Pat. No. 844,900; British Pat. No. 1,251,177 and U.S. Pat. No. 3,957,916.

SUMMARY OF THE INVENTION

The present invention relates to unique and novel catalyst systems for the conventional alpha-olefin type polymerization at significantly improved polymerization activity, wherein the resultant polymers have a high degree of isotactic stereoregularity.

An object of my present invention is to provide improved catalyst systems having a major increase in polymerization activity while being able to control over a wide range the polymer crystallinity, e.g., isotacticity, wherein the catalyst system includes a transition metal compound, a diorganomagnesium compound, and a di- or tri-halide compound of Al, Ga, or In.

A further object of my present invention is to provide an improved process for alpha-olefin type polymerizations, wherein the polymerization activity is increased and the formed polymer has a high degree of isotactic stereoregularity.

A still further object of my present invention is the advantage of being able to use directly the new improved catalyst with any type of transition metal compound without substantial modification of the commercial catalyst preparation or the polymerization plant.

GENERAL DESCRIPTION

It is well known in the art to use an alkyl metal compound of Groups I-III in combination with a transition metal compound of Groups IVB-VIII as a catalyst system for olefinic polymerization. While nearly all of the alkyl metal compounds are effective for the polymerization of ethylene, only a few are effective for the preparation of isotactic polymers of propylene and higher alpha olefins and only $Et_2AlCl$ and $AlEt_3$ have any important commercial utility.

A major cost involved in the polymerization of the alpha olefins is the cost of the catalyst components. Therefore, the cost of the manufacture of the polymer can be effectively reduced by the use of catalyst systems having a higher polymerization activity. A further concern is the ability to produce polymers having a minimum amount of catalyst residues thereby eliminating a costly deashing operation. A still further concern is the ability to produce polymers having a high degree of isotactic stereoregularity thereby enabling the manufacturer to eliminate the costly operation involving the removal and separation of atactic polymer from the isotactic polymer. The improved catalyst system of the present instant invention provides a means to the manufacturer of obtaining these desirable realizations.

The improved catalyst systems of the present invention which are employed in alpha-olefin polymerizations include a Group IVB-VIII transition metal compound, a metal di- or tri-halide compound of Al, Ga, or In and a diorganomagnesium compound.

The transition metal catalyst compound is a Group IVB-VIII transition metal halide, wherein the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide, or its support composition, in the layer lattice structure with very small crystallites, high surface area, or sufficient defects or foreign components to facilitate high dispersion during polymerization. The transition metal halide may also contain various additives such as Lewis bases, pi bases, polymers, or organic or inorganic modifiers. Vanadium and titanium halides such as VCl$_3$, VBr$_3$, TiCl$_3$, TiCl$_4$, TiBr$_3$ or TiBr$_4$ are preferred, most preferably TiCl$_3$ or TiCl$_4$ and mixtures thereof. The most preferred TiCl$_3$ compounds are those which contain TiCl$_4$ edge sites on the layer lattice support such as alpha, delta, or gamma TiCl$_3$ or various structures and modifications of TiCl$_3$ on MgCl$_2$. The most preferred TiCl$_4$ compounds are those supported on chloride layer lattice compounds such as MgCl$_2$. Minor amounts of other anions may be also present such as other halides, pseudohalides, alkoxides, hydroxides, oxides, or carboxylates. Mixed salts or double salts such as K$_2$TiCl$_6$ or MgTiCl$_6$ can be employed alone or in combination with electron donor compounds. Other supports besides MgCl$_2$ which are useful are hydroxychlorides, oxides, or other inorganic or organic supports. The most preferred crystal structure of TiCl$_3$ is delta or pseudo delta, the latter being a mixture of alpha and gamma crystallites. The TiCl$_3$-type catalysts may be prepared from TiCl$_4$ by any one of the reduction and crystallization procedures known in the art (H$_2$, metal, metal hydrides, metal alkyls, etc.). "Low aluminum" containing TiCl$_3$ refers to TiCl$_3$ catalysts which have low Al content because of the method of formation or because a major portion of the aluminum was removed in subsequent reactions.

For the alkyl metal cocatalysts of this invention, the most preferred transition metal compounds contain TiCl$_4$ supported on MgCl$_2$ and, optionally, one or more Lewis bases.

The metal di- or tri-halide compounds are selected from the group consisting essentially of a metal halide compound selected from the group consisting of R"WX$_2$ or R"WXY and mixtures thereof, wherein W is selected from the group consisting of Al, Ga, and In, R" is selected from the group consisting of C$_1$ to C$_{20}$ alkyl, branched alkyl, cycloalkyl, naphthenic and aryl or aralkyl groups which may also contain a Lewis base functionality; X is a halide selected from the groups consisting of chloride and bromide and Y is selected from the group consisting of chloride, bromide, or a monovalent anion which cannot initiate polymerization of olefinic monomers, wherein the anion is selected from the group consisting of alkoxide, phenoxide, thioalkoxide, carboxylate, etc. Typical but non-limiting examples are ethyl aluminum dichloride, aluminum trichloride, ethyl aluminum dibromide, ethyl chloroaluminum bromide, octyl aluminum dichloride, ethyl indium dichloride, butyl aluminum dichloride, benzyl aluminum dichloride, ethyl chloroaluminum butoxide, and mixtures thereof. Mixtures of metal halide compounds can be readily employed.

The C$_2$–C$_4$ alkyl aluminum dihalides are most preferred for high stereospecificity and the monoalkylaluminum dichlorides are most preferred.

The diorganomagnesium compound has the general formula R R'Mg wherein R and R' can be the same or different and R and R' are selected from the group consisting of C$_1$ to C$_{20}$ alkyl, secondary alkyl, tertiary alkyl, branched alkyl, cycloalkyl, naphthenic, aryl, aralkyl, alkenyl and allyl groups. Typical, but non-limiting examples are (C$_6$H$_{13}$)$_2$ Mg, (s-Bu)$_2$Mg, (t-Bu)$_2$ Mg, (iPr)$_2$Mg, (n-Bu)$_2$Mg, dibenzyl Mg, dicrotyl Mg, or (n+S Bu)$_2$Mg. Mixtures of diorganomagnesium compounds can be readily employed. The most preferred organic groups are secondary and tertiary alkyl groups e.g. t-Bu or s-Bu.

Additionally, Lewis bases can be employed in the combination with the metal halide of Al, Ga and In, the diorganomagnesium compound and/or the Group IVB-VIII transition metal compound as long as they do not cause excessive cleavage of metal carbon bonds or loss of active sites, wherein the Lewis base is selected from the group consisting of tertiary amines, esters, phosphines, phosphines oxides, phosphates (alkyl+aryl) phosphites, hexaalky phosphoric triamides, dimethyl sulfoxide, dimethyl formamide, secondary amines, dialkyl ethers, epoxides, saturated and unsaturated heterocycles, or cyclic ethers, and mixtures thereof. Typical but non-limiting examples are diethyl ether, triethyl amine, ethyl benzoate, diisopentyl ether or tetrahydrofuran.

Magnesium salts may also be employed with the instant catalysts if they are partially or wholly solubilized by reaction with the alkyl metal components. Nonlimiting examples include MgBr$_2$, ClMgOR", R"OMgOOCR", Mg(OR")$_2$, and the like.

The molar ratio of the metal halide compound to the diorganomagnesium compound is critical and is about 0.5:1 to about 2:1, more preferably about 0.7:1, and most preferably about 1:1. The number of moles of Lewis base can vary widely but is preferably equal to or less than the sum of the moles of the metal halide compound the diorganomagnesium compound. The molar ratio of the metal halide compound or the diorganomagnesium compound to the transition metal compound is less than about 20:1 and more preferably less than about 10:1.

Also, additional dialkyl aluminum halide type cocatalyst can be employed for further modification of polymerization activity. Diethyl aluminum chloride is a typical, but a non-limiting example.

The catalyst system of the invention enables the process for making alpha olefin polymers having a high degree of isotatic stereoregularity to be carried out at a temperature of about 25° to about 150° C., more preferably about 40° to about 80° C. at pressures of about 1 atm to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably, excess liquid monomer is used as solvent. Gas phase polymerizations may also be carried out with or without minor amounts of solvent.

Typical, but non-limiting examples of C$_2$-C$_{20}$ alpha-olefinic monomers employed in the present invention for the manufacture of homo-, co- and terpolymers are ethylene, propylene, butene-1, pentene-1, hexene-1, octadecene-1, 3-methylbutene-1, styrene, vinylidene norbornene, 1,5-hexadiene and the like and mixtures thereof. Isotactic polymerization of propylene and higher olefins is especially preferred.

The metal halide compound and diorganomagnesium compound can be added separately to the reactor containing the transition metal compound but are preferably premixed before addition to the reactor. Employing either the metal halide compound or the diorganomagnesium compound alone with the transition metal compound does not provide the improved catalyst efficiency and stereospecificity as envisioned in this application. In order to attain this, it is necessary to employ both the metal halide compound and diorganomagnesium compound in combination with the transition metal compound in the critical proportions as previously defined. The concentration of the transition metal in the polymerization zone is about 0.001 to about 5 mM, preferably less than about 0.1 mM.

DETAILED DESCRIPTION OF THE PREFERRED EMBODIMENTS

The advantages of the unique and novel catalyst system and the novel process for the alpha-olefin polymerizations of the present instant invention can be more readily appreciated by reference to the following examples and tables.

EXAMPLE 1

Polymerizations were carried out in a 1 liter baffled resin flask fitted with an efficient reflux condenser and a high speed stirrer. In a standard procedure for propylene polymerizations, 475 ml n-heptane (<1 ppm water) containing 10 mmole $Et_2AlCl$ (1.20 g), or the mixture of cocatalysts, was charged to the reactor under dry $N_2$ heated to reaction temperature (65° C.) and saturated with pure propylene at 765 mm pressure. The $TiCl_3$ (1.00 g) (6.5 mmole) was charged to a catalyst tube containing a stopcock and a rubber septum cap. Polymerization started when the $TiCl_3$ was rinsed into the reactor with 25 ml n-heptane from a syringe. Propylene feed rate was adjusted to maintain an exit gas rate of 200–500 cc/min at a pressure of 765 mm. After one hour at temperature and pressure, the reactor slurry was poured into one liter isopropyl alcohol, stirred 2–4 hours, filtered, washed with alcohol and vacuum dried.

The $TiCl_3$ was prepared by reduction of $TiCl_4$ with $Et_2AlCl$ followed by treatment with diisopentyl ether and $TiCl_4$ under controlled conditions, yielding a high surface area delta $TiCl_3$ having low aluminum content.

The sec-butyl magnesium in Runs B, D and E was obtained from Orgmet and contained 72% non-volatile material in excess of the $s\text{-}Bu_2Mg$ determined by titration. IR, NMR and GC analyses showed the presence of butoxide groups and 0.07 mole diethyl ether per $s\text{-}Bu_2Mg$. A second sample of $(s\text{-}Bu)_2Mg$ was used in Runs G and I. It was substantially pure $s\text{-}Bu_2Mg$ but contained 0.33 mole diethyl ether per $s\text{-}Bu_2Mg$.

TABLE I

| Run | g TiCl₃ | Mmoles EtAlCl₂ | (s-Bu)₂Mg | Et₂AlCl | Rate g/g/h | % HI |
|---|---|---|---|---|---|---|
| A (Control) | 1[a] | 0 | 0 | 10 | 33 | 95.2 |
| B | 1[a] | 5 | 5 | 0 | 152 | 52.6 |
| C (Control) | 1[b] | 0 | 0 | 10 | 85 | 96.3 |
| D | 0.2[b] | 0.4 | 0.2 | 1.6 | 123 | 88.0 |
| E | 0.2[b] | 2 | 2 | 0 | 210 | 49.2 |
| F (Control) | 1[c] | 0 | 0 | 5 | 8 | 79.5 |
| G | 1[c] | 2.5 | 2.5 | 0 | 36 | 57.6 |
| H (Control) | 1[d] | 0 | 0 | 10 | 20 | 91.7 |
| I | 0.2[d] | 1 | 1 | 0 | 200 | 57.4 |

[a] and [b] were different preparations of low aluminum TiCl₃ catalysts.
[c] Stauffer HA grade TiCl₃ (hydrogen-reduced, dry ball milled).
[d] Stauffer AA grade TiCl₃·0.33 AlCl₃ (aluminum-reduced, dry ball milled).

Comparison of runs B, D, E, G and I with their respective control runs A, C, F and H shows that each type of $TiCl_3$ catalyst the novel cocatalyst combination gave 2–10 times higher activity than the customary $Et_2AlCl$ cocatalyst.

The percent heptane insolubles (% HI) decreased substantially using the new cocatalysts. Thus, these high activity catalysts are attractive for making low crystallinity homopolymers of propylene and higher alpha olefins. They are particularly attractive for making thermoelastic polymers and amorphous copolymers and terpolymers for elastomers.

EXAMPLE 2

A titanium catalyst containing $MgCl_2$ was prepared by dry ball milling 4 days a mixture of anhydrous $MgCl_2$ (1 mole), $TiCl_4$ (1 mole) and $\delta\text{-}TiCl_3$ (0.1 mole). Propylene was polymerized using the conditions in Example 1, Run B and the quantities shown in Table 2. Activity with the cocatalysts of this invention (Run L) was intermediate between those of the $AlEt_3$ and $AlEt_2Cl$ controls (Runs J and K), but the stereospecificity as shown by % HI was much higher than the controls. The large increase in % HI obtained with this $MgCl_2$-containing catalyst is in contrast to the results in Example 1 using $TiCl_3$ catalysts in which activity increased sharply but % HI decreased.

TABLE II

| Run | Catalyst | Alkyl Metals | Rate g/g Cat/hr | % HI |
|---|---|---|---|---|
| J(Control) | 1 | 10 AlEt₃ | 79 | 54.4 |
| K(Control) | 1 | 10 AlEt₂Cl | 18 | 35.8 |
| L | 0.2 | 1 AlEtCl₂ + 1 (s-Bu)₂Mg | 42 | 81.0 |

EXAMPLE 3

A titanium catalyst was prepared by dry ball milling 4 days a mixture of 5 $MgCl_2$, 1 $TiCl_4$ and 1 ethyl benzoate, heating a slurry of the solids in neat $TiCl_4$ 2 hours at 80° C., washing with n-heptane and vacuum drying. The catalyst contained 3.78% Ti.

Propylene was polymerized following the procedure of Example 1, Run B. As shown in Table III, all the control runs (M through S) gave substantially lower activity and/or % HI than the $AlEtCl_2 + Bu_2Mg$ combination (Run T) or $AlCl_3 + Bu_2Mg$ (Run U).

If the new cocatalysts simply reacted as the separate alkyl metals compounds, the results should have been like Runs M+Q. If the new cocatalysts simply reacted according to the equation: $AlRCl_2 + R_2Mg \rightarrow AlR_2Cl + RMgCl$, then the results should have been like Runs N+P. However, the results in Run T and U are dramatically better, showing a remarkable synergism.

TABLE III

| Run | Catalyst | Mmoles Al Cpd | Mmoles Mg Cpd | Time Hrs. | Rate g/g Cat/hr | % HI |
|---|---|---|---|---|---|---|
| M (Control) | 0.2 | 1 AlEtCl₂ | — | 0.5 | 0 | — |
| N (Control) | 0.2 | 1 AlEt₂Cl | — | 1 | 47 | 61.1 |
| O (Control) | 0.2 | 1 AlEt₃ | — | 1 | 326 | 82.6 |
| P (Control) | 0.2 | — | 0.83 s-Bu MgCl | 0.25 | 0 | — |
| Q (Control) | 0.2 | — | 0.83 (s-Bu)₂Mg | 0.25 | 0 | — |
| R (Control) | 0.2 | 1 AlEt₃ | 0.83 (s-Bu)₂Mg | 0.25 | 6 | — |

TABLE III-continued

| Run | Catalyst | Mmoles Al Cpd | Mmoles Mg Cpd | Time Hrs. | Rate g/g Cat/hr | % HI |
|---|---|---|---|---|---|---|
| S (Control) | 0.2 | 1 AlEt$_2$Cl | 0.83 (s-Bu)$_2$Mg | 1 | 165 | 80.5 |
| T | 0.2 | 1 AlEtCl$_2$ | 0.83 (s-Bu)$_2$Mg | 1 | 367 | 91.9 |
| U | 0.2 | 1 AlCl$_3$ | 0.83 (s-Bu)$_2$Mg | 1 | 220 | 88.9 |

A much smaller synergistic effect was obtained by combining AlEt$_2$Cl+Bu$_2$Mg (Run S), but the results were poorer than those obtained with AlEt$_3$. Combining Bu$_2$Mg with AlEt$_3$ (Run R) destroyed the activity shown by AlEt$_3$ alone (Run O). Thus, the outstanding results were obtained only when R$_2$Mg was combined with RAlCl$_2$ or AlCl$_3$.

EXAMPLE 4

The procedure of Example 3 was followed using 0.2 g of the MgCl$_2$-containing catalyst together with (s-Bu)$_2$Mg and variations aluminum compounds.

TABLE IV

| Run | Mmoles Al Cpd | Mmoles (s-Bu)$_2$Mg | Time Hrs. | Rate g/g Cat/hr | % HI |
|---|---|---|---|---|---|
| V | 0.4 AlEtCl$_2$ | 0.33 | 1 | 60 | 94.5 |
| W | 1 AlEtCl$_2$ | 0.41 | 1 | 64 | 76.6 |
| X | 0.5 AlEtCl$_2$ | 0.83 | 1 | 260 | 87.2 |
| Y | 0.5 AlCl$_3$ | 0.83 | 2 | 136 | 90.7 |
| Z | 1 AlEtCl$_2$ + 1 AlEt$_2$Cl | 0.83 | 1 | 404 | 86.9 |
| AA | 1 AlEtBr$_2$ | 0.83 | 1 | 220 | 88.9 |
| BB | 1 AlC$_8$H$_{17}$Cl$_2$ | 0.83 | 1 | 425 | 88.0 |
| CC | 0.63 EtClAlN(iPr)$_2$ | 0.53 | 1 | 6 | — |
| DD | 1 Br$_2$AlN(iPr)$_2$ | 0.83 | 1 | 16 | — |

Comparison of Runs, V, W and X shows that the highest % HI is obtained at approximately equimolar amounts of RAlCl$_2$ and R$_2$Mg (Run V), that a large excess of RAlCl$_2$ is undesirable (Run W) and that a small excess of R$_2$Mg increases activity (Run X). Activity also increased upon addition of AlEt$_2$Cl to the AlEtCl$_2$-(s-Bu)$_2$Mg systme (Run Z). The remainder of the experiments show that the dibromide may be used in place of dichloride (Run AA), that long chain alkyl aluminum compounds are very effective (Run BB), but that dialkyl amide groups on the aluminum compound destroy catalyst activity (Runs CC and DD).

EXAMPLE 5

The procedure of Example III, Run T was followed except that Lewis bases were also added to the AlEtCl$_2$(s-Bu)$_2$Mg cocatalysts.

Addition of Lewis bases causes a decrease in catalyst activity until it becomes zero at a mole ratio of one strong base per mole of RAlCl$_2$+R$_2$Mg.

TABLE V

| Run | Mmoles Base/(sec Bu)$_2$Mg | Time, Hrs | Rate g/g Cat/hr | % HI |
|---|---|---|---|---|
| EE | 0.24 φCOOEt[a] | 0.5 | 174 | 94.3 |
| FF | 0.5 Et$_3$N[b] | 1 | 62 | 85.5 |
| GG | 2 Diisopentyl ether | 1 | 127 | 78.8 |
| HH | 2 Tetrahydrofuran[c] | 1 | 0 | — |

[a] Added to the (s-Bu)$_2$Mg
[b] Premixed total catalyst in 100 ml n-heptane at 65° C., 5 min. before adding Et$_3$N
[c] Added to premixed AlEtCl$_2$—(s-Bu)$_2$Mg As shown in Run EE, small quantities of Lewis base are effective in improving isotacticity (94.3% HI vs. 91.9 in Run T) while maintaining high activity (nearly 9 times the conventional AlEt$_2$Cl/TiCl$_3$.0.33 AlCl$_3$ catalyst, Run H).

EXAMPLE 6

The procedure of Example III, Run T was followed except that xylene diluent was used for polymerization instead of n-heptane. Activity was 676 g/g Cat/hr and the polymer gave 90.9% heptane insolubles.

EXAMPLE 7

The procedure of Example 3, Run T was followed except that polymerization was carried out at 50° C. and 80° C. Both polymerization rate and % HI decreased with increasing temperature, with the largest decrease taking place above 65° C.

TABLE VI

| Run | Polymer Temp, °C. | Time, Hours | Rate | % HI |
|---|---|---|---|---|
| II | 50 | 1 | 474 | 90.4 |
| T | 65 | 1 | 367 | 91.9 |
| JJ | 80 | 0.5 | 148 | 74.6 |

EXAMPLE 8

Propylene was polymerized at 690 kPa pressure in a stirred autoclave at 50° C., 1 hour. A second preparation of MgCl$_2$-containing TiCl$_4$ catalyst (2.68% Ti) made as in Example 3 except that TiCl$_4$-ethylbenzoate complex was preformed, was used in combination with AlRCl$_2$-R$_2$Mg. High stereospecificity was obtained at high rates and catalyst efficiencies.

TABLE VII

| Run | g Cat | Mmoles AlEtCl$_2$ | Mmoles (s-Bu$_2$)Mg | Rate | % HI |
|---|---|---|---|---|---|
| KK | 0.10 | 0.5 | 0.5 | 1672 | 88.8 |
| LL | 0.10 | 0.25 | 0.25 | 696 | 95.0 |

EXAMPLE 9

The procedure of Example 3, Run T was followed except that the catalyst of Example 8 was used and 1 mmole di-n-hexyl magnesium was used instead of 0.83 mmole (s-Bu)$_2$ Mg. The (n-hexyl)$_2$Mg in Soltrol #10 was obtained from Ethyl Corporation (Lot No. BR-516). Polymerization rate was 551 g/g Cat/hr and the polymer gave 76.9% HI.

EXAMPLE 10

The procedure of Example 5, Run EE was followed except that the catalyst of Example 8 was used, 0.5 mmole diethyl ether was used in place of ethylbenzoate, and Lithium Corporation (n+s Bu)$_2$Mg in hexane was used in place of (s-Bu)$_2$Mg. Rate was 327 g/g Cat/hr and % HI=91.8.

EXAMPLE 11

The procedure of Example 10 was followed except that a new pure sample of (sec-Bu)$_2$Mg was used with 0.33 mole diethyl ether. Rate was 268 g/g Cat/hr and % HI=92.2.

EXAMPLE 12

A catalyst was prepared by dry ball milling 4 days a mixture of 10 MgCl$_2$, 2 TiCl$_4$, 2 ethylbenzoate and 1 Mg powder, heating the solids in neat TiCl$_4$ 2 hours at 80°

C., washing with n-heptane and vacuum drying (Ti=2.16%).

Propylene was polymerized 1 hour at 65° C. and atmospheric pressure using 0.20 g of this catalyst under the conditions of Example 3, Run T except only 0.4 mmole (s-Bu)$_2$Mg and 0.4 mmole AlEtCl$_2$. Rate was 240 g/g Cat/hr and % HI=93.9.

EXAMPLE 13

A catalyst was prepared by dry ball milling 1 day a mixture of 5 MgCl$_2$ and 1 ethylbenzoate, adding 1 TiCl$_4$ and milling an additional 3 days, then treating the solids with neat TiCl$_4$ 2 hours at 80° C., washing with n-heptane and vacuum drying (3.44% Ti).

Propylene was polymerized following the procedure of Example 3, Run T, except that 1 mmole (s-Bu)$_2$Mg was used instead of 0.83 mmole. Rate was 298 g/g Cat/hr and % HI=89.

EXAMPLE 14

Following the procedure in Example 8, two catalysts were made at different Mg/Ti ratios. Catalyst A was made with 1 MgCl$_2$+1 TiCl$_4$-ethylbenzoate and B (2.10% Ti) was made with 10 MgCl$_2$+1 TiCl$_4$-ethylbenzoate complex. Propylene was polymerized following the procedure of Example 3, Run T (Table 8).

TABLE VIII

| Run | g Cat | Mmoles AlEtCl$_2$ | Mmoles (s-Bu)$_2$Mg | Rate | % HI |
|---|---|---|---|---|---|
| MM | 0.107A | 2 | 1.66 | 60 | 72.0 |
| NN | 0.316B | 0.25 | 0.25 | 512 | 60.4 |
| OO[a] | 0.316B | 0.25 | 0.25 | 124 | 84.2 |

[a]Added 0.25 mmole triethylamine to the alkyl metal cocatalysts.

Since many modifications and variations of the invention may be made without departing from the spirit or scope of the invention thereof, it is not intended to limit the sprit or scope to the specific examples thereof.

What is claimed is:

1. An improved catalyst composition adaptable for use in propylene polymerization for the production of polypropylene resin having less than about 11.0 weight percent heptane solubles which consists of a mixture of:
   (a) TiCl$_4$ supported on MgCl$_2$, said TiCl$_4$ supported on MgCl$_2$ being prepared by dry ball milling a mixture of said MgCl$_2$, said TiCl$_4$ and ethyl benzoate;
   (b) (s-Bu)$_2$Mg; and
   (c) an alkyl aluminum dihalide having the formula RAlX$_2$, wherein X is Cl or Br and R is an alkyl group having 2 to 8 carbon atoms, a molar ratio of said alkyl aluminum dihalide to said (s-Bu)$_2$Mg being 0.5:1 to 2:1, and the molar ratio of said alkyl aluminum dihalide or said (s-Bu)$_2$Mg to said TiCl$_4$ supported on said MgCl$_2$, being less than 20:1.

* * * * *